(12) United States Patent
Kudoh (10) Patent No.: US 7,714,904 B2
(45) Date of Patent: May 11, 2010

(54) SOLID-STATE IMAGING DEVICE AND METHOD FOR DRIVING THE SAME

(75) Inventor: Yoshiharu Kudoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 981 days.

(21) Appl. No.: 11/303,620

(22) Filed: Dec. 16, 2005

(65) Prior Publication Data

US 2006/0132634 A1     Jun. 22, 2006

(30) Foreign Application Priority Data

Dec. 20, 2004     (JP) .......................... P2004-367223

(51) Int. Cl.
  *H04N 5/235*     (2006.01)
  *H04N 5/335*     (2006.01)
  *H04N 3/14*      (2006.01)
(52) U.S. Cl. .................... 348/230.1; 348/302
(58) Field of Classification Search ............. 348/230.1, 348/274, 277–279, 317, 320, 322, 272, 273, 348/281, 290, 292, 302, 315; 250/208.1
See application file for complete search history.

(56) References Cited

U.S. PATENT DOCUMENTS

| | | | | |
|---|---|---|---|---|
| 4,712,141 A | * | 12/1987 | Tomohisa et al. | 358/445 |
| 4,996,600 A | * | 2/1991 | Nishida et al. | 348/322 |
| 5,512,945 A | * | 4/1996 | Sakurai et al. | 348/221.1 |
| 5,982,450 A | * | 11/1999 | Nakamura | 348/554 |
| 6,141,048 A | * | 10/2000 | Meyers | 348/294 |
| 6,469,290 B1 | * | 10/2002 | Suzuki | 250/208.1 |
| 6,873,360 B1 | * | 3/2005 | Kawashiri | 348/296 |
| 7,265,783 B2 | * | 9/2007 | Fukuda | 348/240.2 |
| 2004/0080629 A1 | * | 4/2004 | Sato et al. | 348/222.1 |
| 2007/0080629 A1 | * | 4/2007 | Ko | 313/504 |

FOREIGN PATENT DOCUMENTS

JP   2004-147092   5/2004
JP   2004-312496   11/2004

OTHER PUBLICATIONS

Japanese Office Action issued on Jan. 13, 2009.

* cited by examiner

*Primary Examiner*—Jason Whipkey
*Assistant Examiner*—Euel K Cowan
(74) *Attorney, Agent, or Firm*—Sonnenschein Nath & Rosenthal LLP (57) ABSTRACT

A solid-state imaging device includes a pixel array in which a plurality of pixel cells, each of which includes a plurality of photoelectric conversion elements, is arranged, and an adder for performing an addition operation on a plurality of signals output from the photoelectric conversion elements of the pixel array in a predetermined combination of the photoelectric conversion elements, while setting between the signals to be added a ratio determined according to the arrangement of the photoelectric conversion elements.

12 Claims, 10 Drawing Sheets

Prior Art

FIG. 10B $$Q_{1234} = Q_{12} + \frac{3}{5} Q_{34}$$

FIG. 10A
ORIGINAL SIGNAL

FIG. 11

SOLID-STATE IMAGING DEVICE AND METHOD FOR DRIVING THE SAME

CROSS REFERENCES TO RELATED APPLICATIONS

The present invention contains subject matter related to Japanese Patent Application JP 2004-367223 filed in the Japanese Patent Office on Dec. 20, 2004, the entire contents of which are incorporated herein by reference.

BACKGROUND OF THE INVENTION

1. Field of the Invention

The present invention relates to solid-state imaging devices for capturing images and producing image signals by means of a plurality of photoelectric conversion elements and also to driving methods for driving such imaging devices. More particularly the present invention relates to a solid-state imaging device which performs an addition operation on pixel data and then outputs the result, and to a driving method therefor.

2. Description of the Related Art

In general, driving modes for an image sensor includes an all-image readout mode in which all pixels are read out for normal applications and a low-resolution readout mode in which pixels are read out at a low resolution for high frame rate applications. In the mode for high frame rate applications, data rate is effectively reduced by skipping pixels, but aliasing noise is undesirably increased at the same time due to low sampling frequency. To reduce the aliasing noise, there is a known method of adding and averaging signals of adjacent pixels instead of skipping pixels in the course of readout (See, for example, Japanese Unexamined Patent Application Publication No. 2004-356791).

SUMMARY OF THE INVENTION

However, this known method has a disadvantage of low flexibility in operation, since it performs simple addition and averaging operations during reading. For example, when an addition operation is performed on even numbers of pixels out of a plurality of pixels arranged in rows and columns, an addition operation adjacent pixels on a color-by-color basis of the Bayer array produces unequal pitches between the virtual pixel centers which are output upon completion of the addition operation. This results in an image inconsistent with an expected low-resolution image in the Bayer array, which causes degradation of the quality in the processed image.

The present invention addresses the problem described above. More specifically, according to an embodiment of the present invention, a solid-state imaging device includes a pixel array in which a plurality of pixel cells, each of which includes a plurality of photoelectric conversion elements, is arranged, and an adder for performing an addition operation on a plurality of signals output from the photoelectric conversion elements of the pixel array in a predetermined combination of the photoelectric conversion elements, while setting between the signals to be added a ratio determined according to the arrangement of the photoelectric conversion elements.

According to another embodiment of the present invention, a solid-state imaging device includes a pixel array in which a plurality of pixel cells, each of which includes a plurality of photoelectric conversion elements, is arranged, and a controller for controlling exposure times on the photoelectric conversion elements using a ratio determined according to the arrangement of the plurality of photoelectric conversion elements, when an addition operation is performed on a plurality of signals output from the plurality of photoelectric conversion elements in the pixel array in a predetermined combination.

According to still another embodiment of the present invention, provided is a driving method for driving a solid-state imaging device having a pixel array in which a plurality of pixel cells, each of which includes a plurality of photoelectric conversion elements, is arranged, and an adder for performing an addition operation on a plurality of signals output from the plurality of photoelectric conversion elements in the pixel array in a predetermined combination. The method includes the step of causing the adder to perform the addition operation on the plurality of signals using a ratio determined according to the arrangement of the plurality of photoelectric conversion elements.

According to a further embodiment of the present invention, provided is a driving method for a solid-state imaging device having a pixel array in which a plurality of pixel cells, each of which includes a plurality of photoelectric conversion elements, is arranged, and a controller for controlling an exposure times on the plurality of photoelectric conversion elements in the pixel array. The method includes the step of causing the controller to control the exposure times using a ratio determined according to the arrangement of the plurality of photoelectric conversion elements when the addition operation is performed on the plurality of signals output from the plurality of photoelectric conversion elements in the pixel array in a predetermined combination.

DESCRIPTION OF THE PREFERRED EMBODIMENTS

Figure 1:
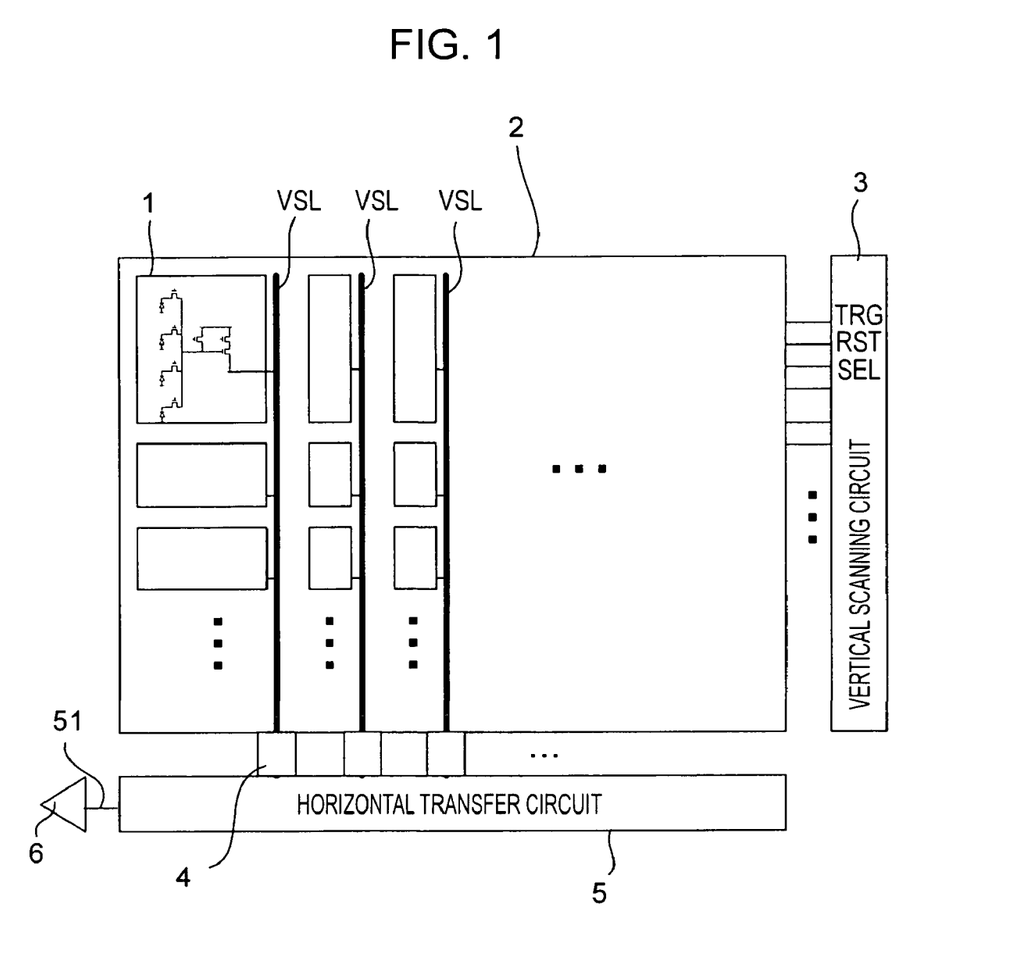
FIG. 1 is a schematic diagram illustrating the entirety of a solid-state imaging device according to an embodiment of the present invention.

Embodiments of the present invention will be described with reference to the accompanying drawings. FIG. 1 is a schematic diagram illustrating the entirety of a solid-state imaging device according to an embodiment of the present invention.

More specifically, FIG. 1 is a block diagram illustrating an exemplary configuration of a solid-state imaging device, for example, a CMOS (Complementary Metal Oxide Semiconductor) image sensor according to an embodiment of the present invention. As shown in FIG. 1, the solid-state imaging device includes a pixel array 2 in which a plurality of the pixel cells 1 each having a plurality of photoelectric conversion elements is two-dimensionally arranged in matrix form, a vertical scanning circuit 3, column circuits 4 for signal processing, a horizontal transfer circuit 5, a horizontal signal line 51, an output circuit 6, and so forth. In the pixel array 2, a vertical signal line VSL is provided in connection with each vertical pixel column.

Figure 2:
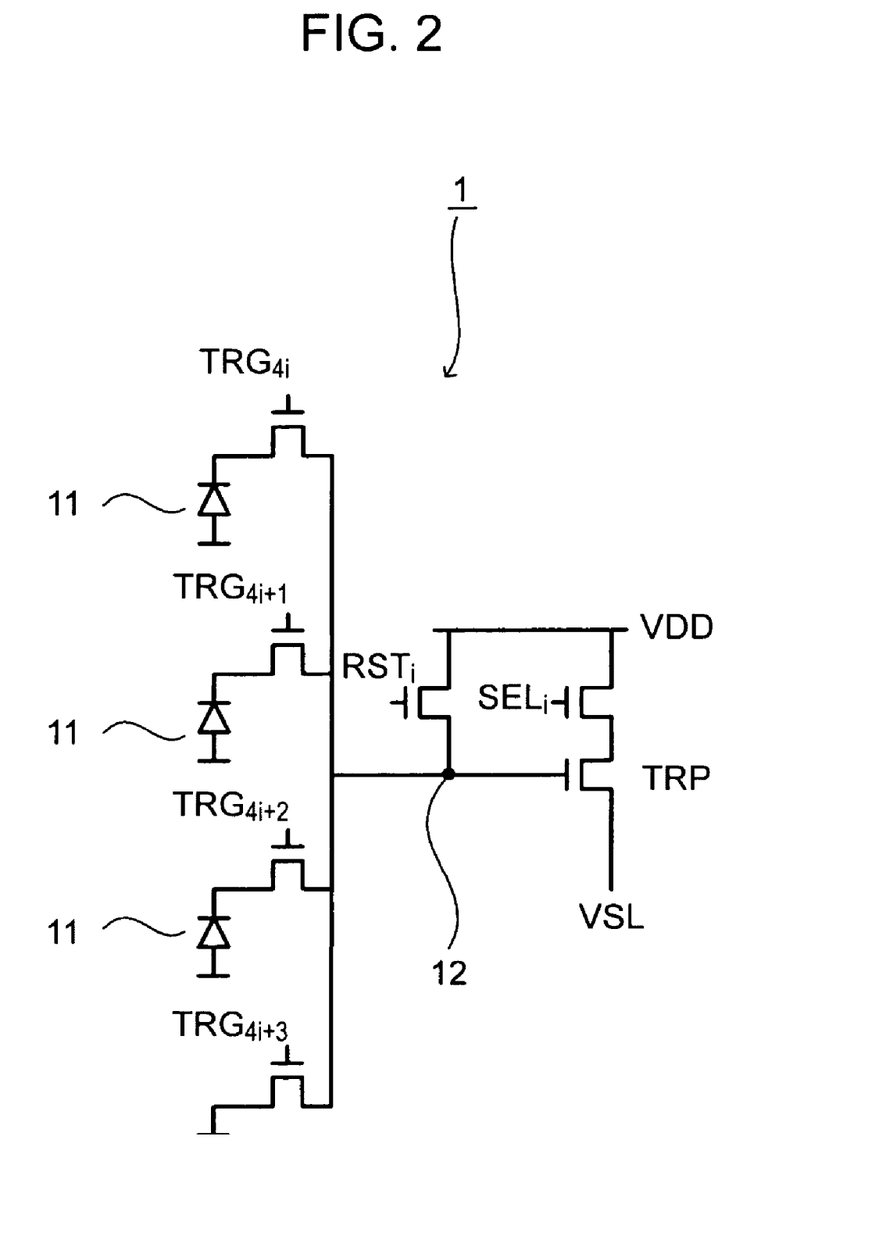
FIG. 2 is a circuit diagram illustrating a specific configuration of one pixel cell.

FIG. 2 is a circuit diagram illustrating a specific configuration of one pixel cell in a pixel column.

As shown in FIG. 2, a pixel cell 1 is configured as a pixel circuit including not only a plurality of (four in this case) photoelectric conversion elements such as photodiodes 11 but also four kinds of transistors, that is, transfer transistors TRGs, a reset transistor RST, an amplifying transistor TRP and a selecting transistor SEL. In this case, N-channel MOS transistors, for example, are used as these transistors.

Each photodiode 11 performs photoelectric conversion and stores a signal charge (electrons in this case). The transfer transistor TRG transfers the signal charge to a FD (floating diffusion) portion 12. The reset transistor RST connected between the FD portion 12 and a power supply VDD resets the potential of the FD portion 12, in advance of the transfer of the signal charge from the photodiode 11.

The amplifying transistor TRP supplies the vertical signal line VSL with a reset level which is the potential of the FD portion 12 reset by the reset transistor RST and also with a signal level which is the potential of the FD portion 12 after the transfer of the signal charge by the transistor TRG.

The selecting transistor SEL connected between the amplifying transistor TRP and the power supply VDD has a function to select a pixel cell 1.

Referring back to FIG. 1, the vertical scanning circuit 3 includes a shift resister or the like and selectively drives each pixel cell 1 in the pixel array 2 on a row-by-row basis by sequentially outputting control signals on a row-by-row basis. The control signals include a transfer signal for driving the transfer transistor TRG in the pixel cell 1 and a reset signal for driving the reset transistor RST in the pixel cell 1.

The column circuits 4 are signal processing circuits, and each column circuit is provided for each pixel arranged in horizontal direction in the pixel array 2, that is, for each vertical signal line VSL. For example, the column circuit 4 includes a S/H (sample and hold) circuit and a CDS (Correlated Double Sampling) circuit.

First Embodiment

Figure 3A:
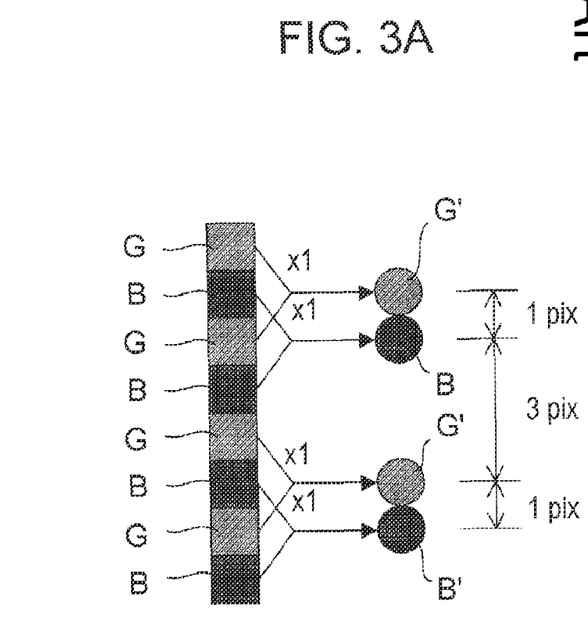
FIG. 3A is a conceptual diagram illustrating a technique in a known art.
Figure 3B:
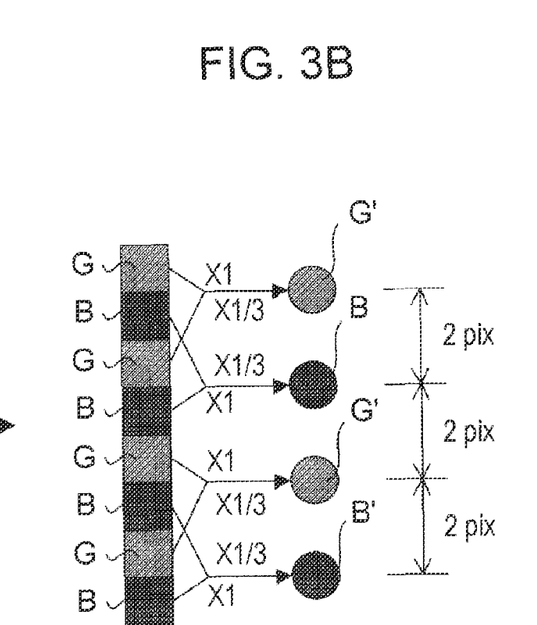
FIG. 3B is a conceptual diagram illustrating an embodiment of the present invention.

FIGS. 3A and 3B are conceptual diagrams illustrating a technique in a known art and a first embodiment of the present invention, respectively. Virtual pixel centers, which are obtained by mixing two pixels of an identical color when pixels corresponding to G (green) and B (blue) are alternatively arranged in a column, are illustrated in these figures.

FIG. 3A illustrates an addition operation according to the known art. Since two pixel signals, each from a single pixel of the identical color, are simply added and averaged, pitches between the centers of each pair of the adjacent virtual pixels G' and B' after addition are not equal.

In contrast, FIG. 3B illustrates an addition operation according to the first embodiment of the present invention. The pitches between the centers of each pair of the adjacent virtuals G' and B' after addition can be equalized by setting a specific value of addition ratio between the input signals in an analog signal processing. In other words, the resolution can be reduced without changing the color arrangement.

For example, when two pixel signals from two pixels of the identical color are added, an addition ratio of 3:1 is set between the pair of pixel signals G (green) and also between the pair of pixel signals B (blue), as illustrated in FIG. 3B. The pitches between the centers of the successive pairs of virtual pixels G' and B' can be equalized to 2 pixel pitches (pix) by using this ratio.

Figure 4:
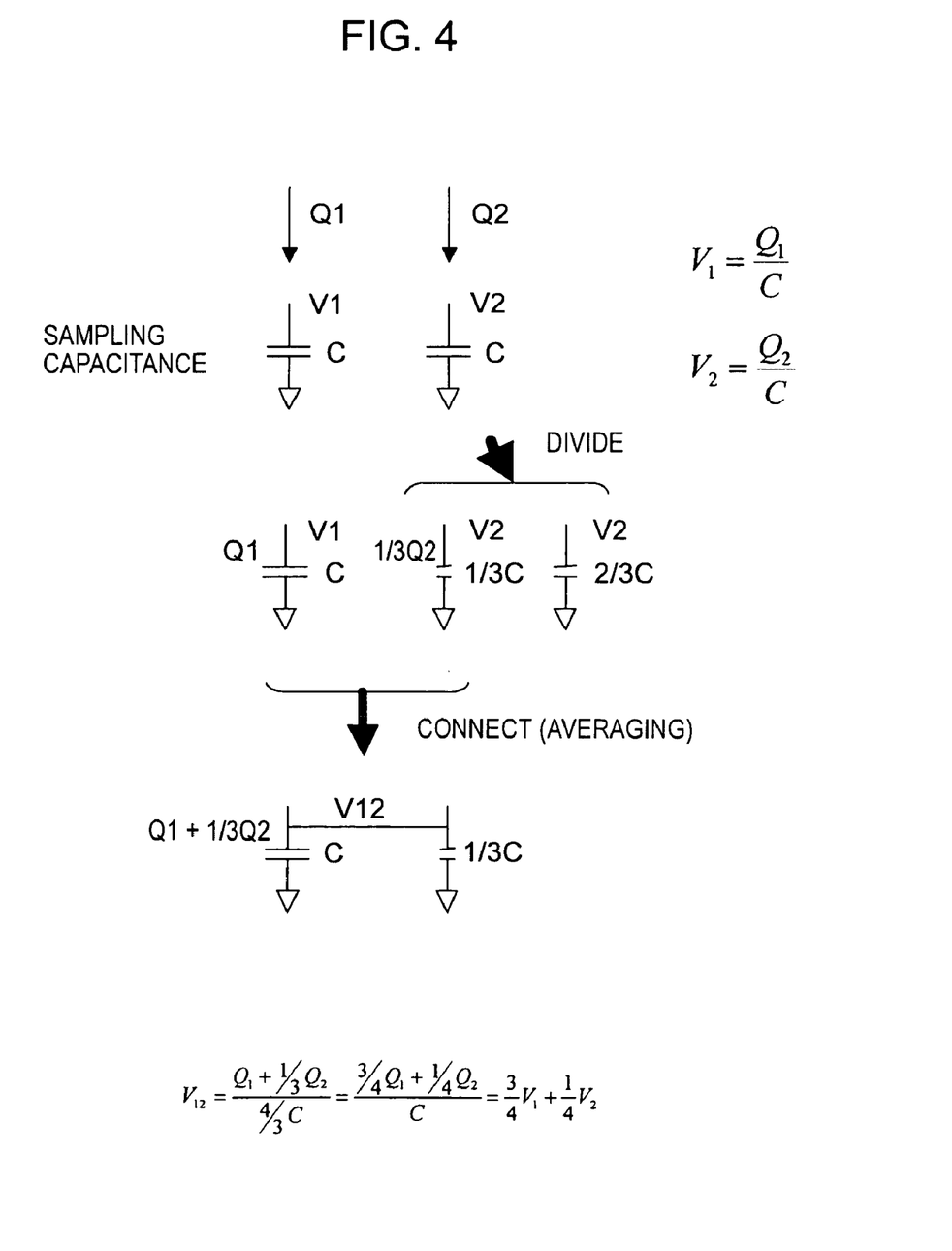
FIG. 4 is a schematic diagram illustrating an example in which an embodiment of the present invention is applied to a CDS circuit in a column circuit.

A technique for implementing this method will now be described by way of example. FIG. 4 is a schematic diagram illustrating an example in which the first embodiment of the present invention is applied to a CDS circuit in a column circuit. In this embodiment, a storage capacitance of a sampling portion is configured to be divisible so that the amounts of the signal charges to be averaged are controlled in accordance with the addition ratio to be obtained.

More specifically, two systems of the storage capacitances, a system Q1 and a system Q2, are provided in the sampling portion. The capacitance of one system (for example, Q2) is configured to be divided into two fractions: namely, one-third and two-thirds of the capacitance of the system Q1. For example, the capacitance of the system Q1 and the fraction of the system Q2 equivalent to the one-third of the capacitance of the system Q1 side are connected so as to enable addition and averaging of the stored charges, whereby the addition and averaging operation at the addition ratio of 3:1 is performed.

Figure 5A:
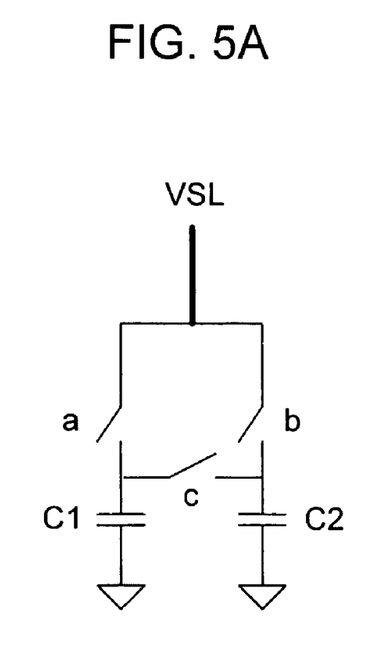
FIG. 5A shows an exemplary circuit configuration used for an addition operation in the row direction.
Figure 5B:
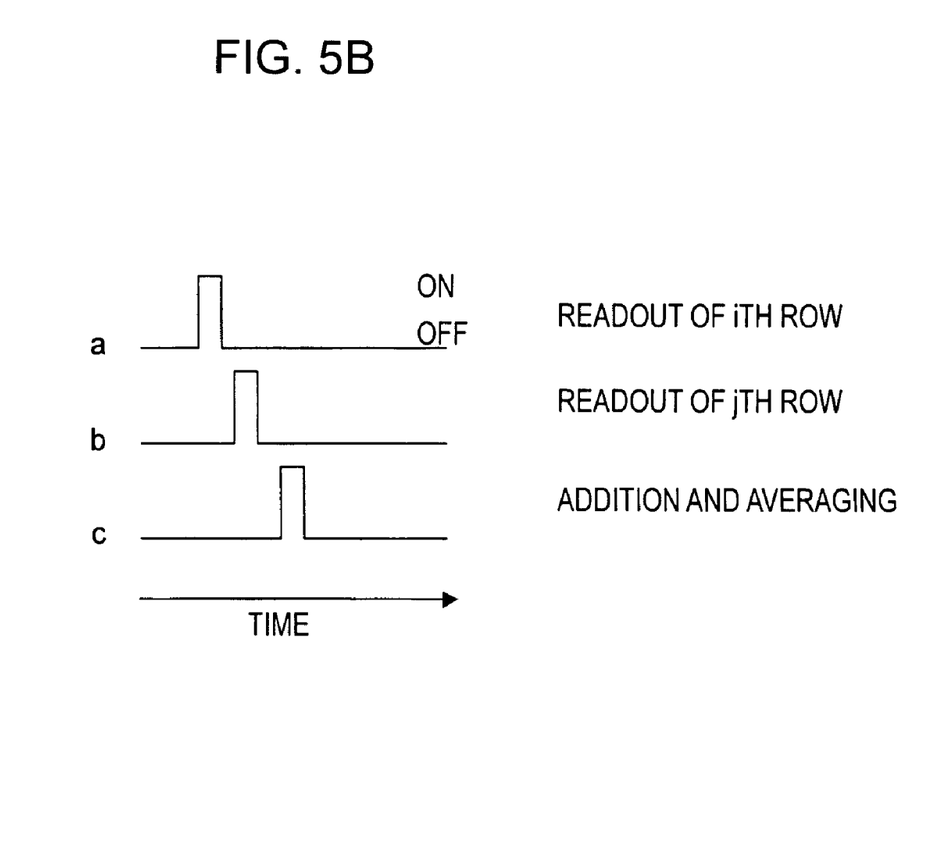
FIG. 5B is a timing chart illustrating an addition operation in the row direction.
Figures 6A, 6B:
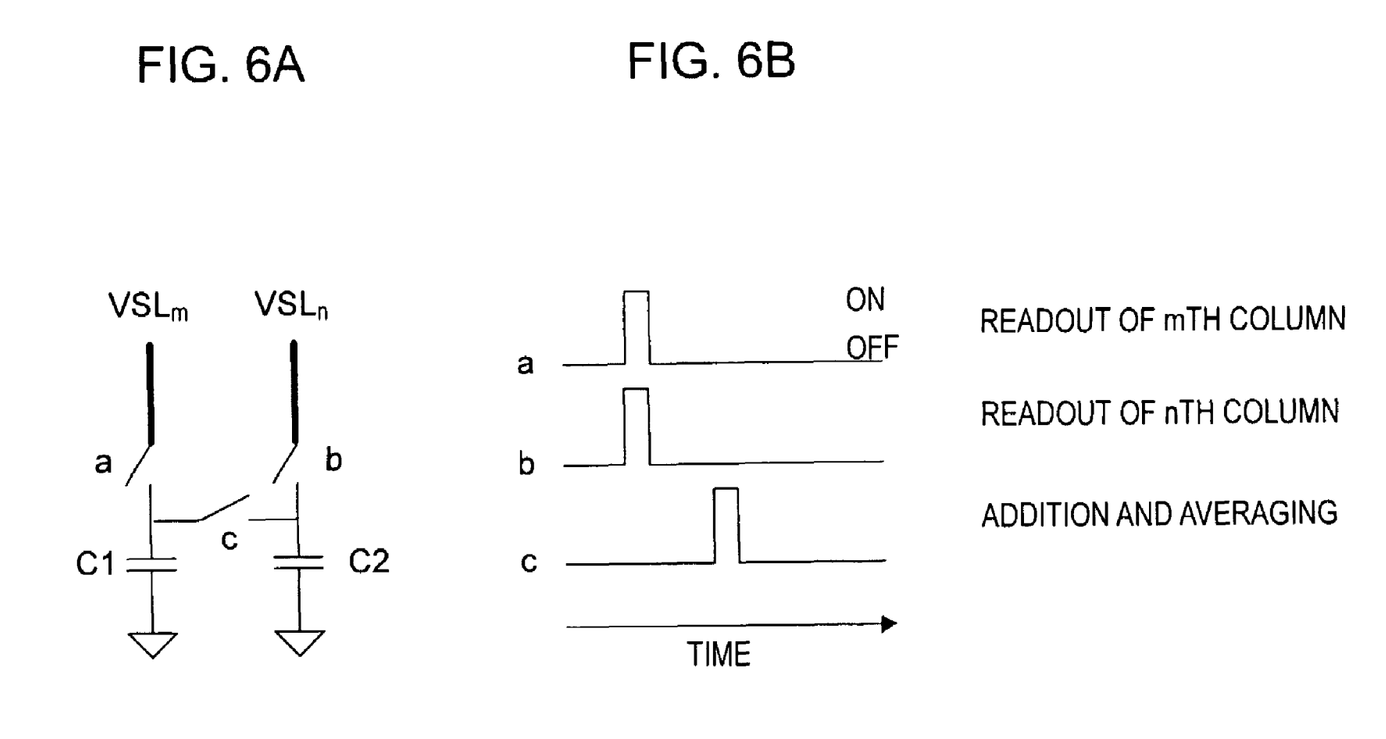
FIG. 6A shows an exemplary circuit configuration used for an addition operation in the column direction.
FIG. 6B is a timing chart illustrating an addition operation in the column direction.

This technique can effectively be used in signal processing both in the row direction and the column direction. FIGS. 5A and 5B illustrate an addition operation in the row direction. FIGS. 6A and 6B illustrate an addition operation in the column direction.

Referring to FIG. 5A, an exemplary circuit configuration used for the addition operation in the row direction will be described. When the addition operation in the row direction is performed, each signal VSL output from one of the two pixels to be added is connected to one of the two systems. A capacitor C1 is connected to one system and a capacitor C2 is connected to the other system. The capacitance of the capacitor C1 is three times greater than that of the capacitor C2. Switches "a" and "b" are provided in one and the other systems, respectively, and a switch "c" is provided therebetween. Referring to FIG. 5B, the addition operation in the row direction will now be described. Using the configuration illustrated in FIG. 5A, the signal from a pixel in ith row is stored in the capacitor C1 by holding the switches "a", "b", and "c" in the states of ON (closed), OFF (open), and OFF, respectively. Likewise, the signal from a pixel of the identical color in the jth row is stored in the capacitor C2 by holding the switches "a", "b", and "c" in the states of OFF, ON, and OFF, respectively. The signals stored in the capacitor C1 and the capacitor C2 are then added by turning the switch "c" ON while the switches "a" and "b" are held OFF, whereby an added-averaged signal according to the capacitance ratio can be obtained.

Referring to FIG. 6A, an exemplary circuit configuration used for the addition operation in the column direction will be described. When the addition operation in the column direction is performed, a signal VSLm from a pixel cell in the mth column is connected to the capacitor C1 and a signal VSLn from a pixel cell in the nth column is connected to the capacitor C2. The capacitance of the capacitor C1 is three times greater than that of the capacitor C2. A switch "a" is provided for the signal VSLm, a switch "b" is provided in the signal VSLn side, and a switch "c" is provided therebetween. Referring to FIG. 6B, the addition operation in the column direction will now be described. Using the configuration illustrated in FIG. 6A, the signal from a pixel cell in mth column is stored in the capacitor C1 and the signal from a pixel cell in nth column is stored in the capacitor C2 by simultaneously setting the switches "a", "b", and "c" in the states of ON (closed), ON, and OFF, respectively, as shown in FIG. 6B. The signals stored in the capacitor C1 and the capacitor C2 are then added by turning the switch "c" ON while the switches "a" and "b" are held OFF, whereby an added-averaged signal according to the capacitance ratio can be obtained.

Second Embodiment

Figure 7:
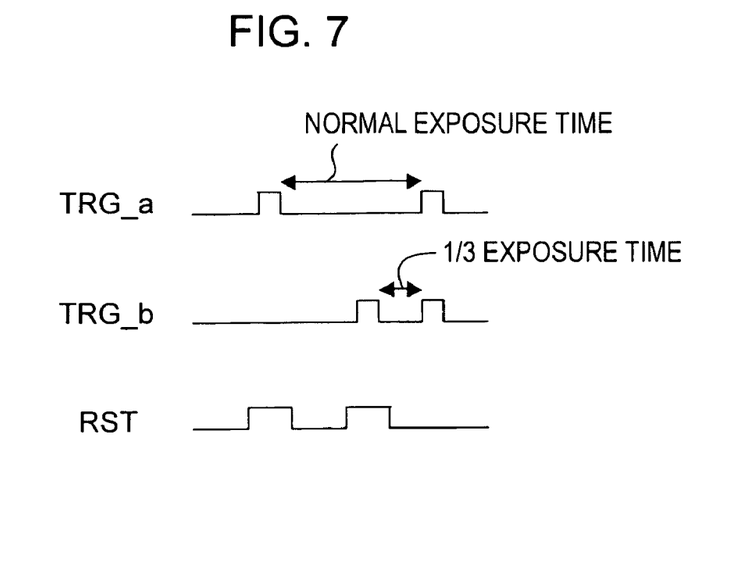
FIG. 7 is a timing chart illustrating the differences in photoelectric conversion time between pixels to be added.

In the first embodiment, an addition operation is performed in the sampling portion in a CDS circuit. However, for an image sensor configured to have a FD portion shared between pixel cells, a charge-addition operation in the FD portion is more advantageous for high sensitivity and operational speed. In this case, addition and averaging operations for signal processing similar to those described in the first embodiment can be achieved, by adjusting an exposure time on each pixel intended for an addition operation, as shown in FIG. 7.

Specifically, a vertical scanning circuit 3 performs a control operation, so that the time interval between ON periods (exposure time) of a transfer transistor TRG_a of a first pixel intended for an addition operation may be set to be the normal exposure time, and the time interval between ON periods of a transistor TRG_b of a second pixel intended for the addition operation may be set to be one-third shorter than that of TRG_a. This yields a ratio between the charge amounts of the first pixel and the second pixel, which corresponds to the ratio of the exposure times. These charge amounts are added in the FD portion and the result is output, whereby an added-averaged signal corresponding to the ratio of the exposure times can be obtained. Meanwhile, when performing a charge-addition operation in a charge-to-voltage converter, division on capacitance in the CDS circuit is not necessary, as with the cases of known arts.

In this embodiment, the FD portion is configured to be shared among pixels vertically arranged. A signal processing can likewise be achieved also when the FD portion is shared among pixels horizontally arranged. In addition, the technique changing an addition ratio by setting different exposure times can also be employed when FD portion is not shared.

Third Embodiment

Figure 8:
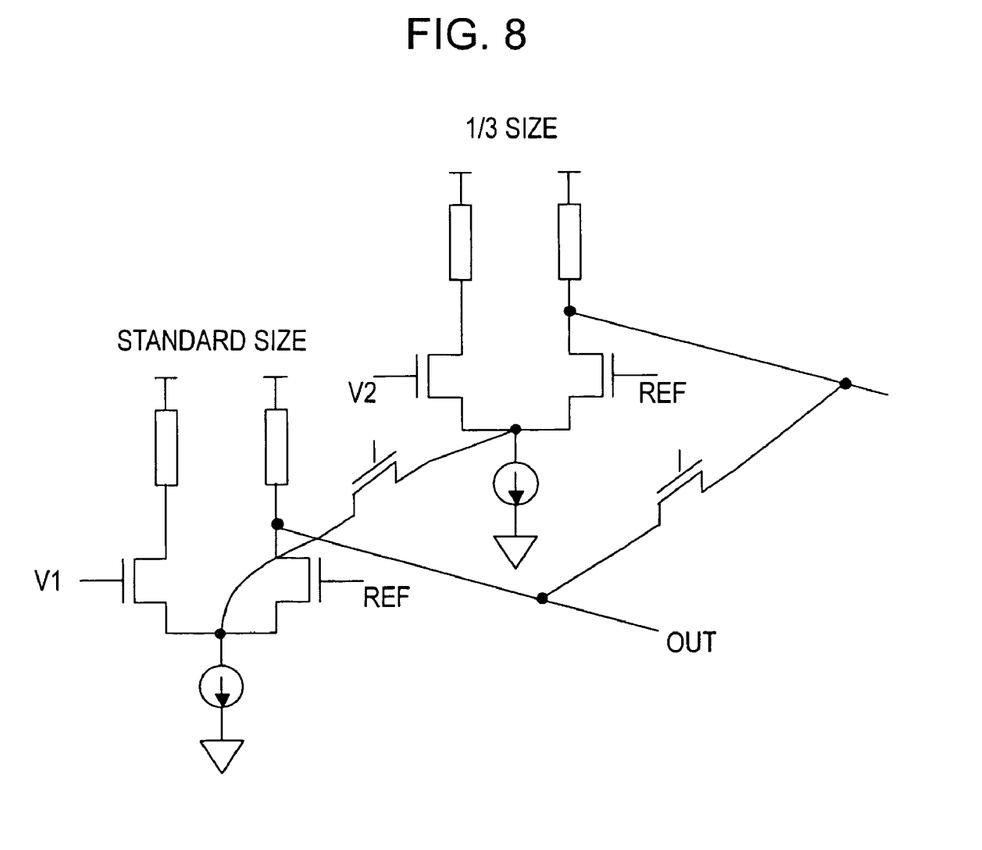
FIG. 8 is a circuit diagram illustrating different-sized differential circuits.

Embodiments of the present invention may also be applicable to other signal readout configurations than the CDS circuit. For example, a signal processing technique can likewise be achieved even when a column circuit having an analog-to-digital converter (ADC) is provided for each column. For a comparison circuit in the ADC, differential circuits whose sizes i.e., amplification factors, are different from each other, e.g., Standard Size and ⅓ Size, may be connected in parallel as shown in FIG. 8. Further, it becomes possible to switch between various output resolution modes by changing the connections of a plurality of differential circuits of various sizes appropriately.

Fourth Embodiment

In the configuration described in the second embodiment in which a FD portion is shared, an addition operation can be performed between pixels that share the FD portion. However, this addition operation is inapplicable to pixels that do not share the FD portion. For example, when the FD portion is to be shared between four pixels vertically arranged, a charge-addition operation can be performed on two pixels of each identical color. However, when an addition operation is desired with respect to three pixels of an identical color and three pixels of another identical color (3×3 pixels) or 4×4 pixels, for example, a driving method other than the one in the above described embodiment is necessary, since a unit of pixels to be added includes one or more pixels which belong to a different FD sharing unit.

Figure 9:
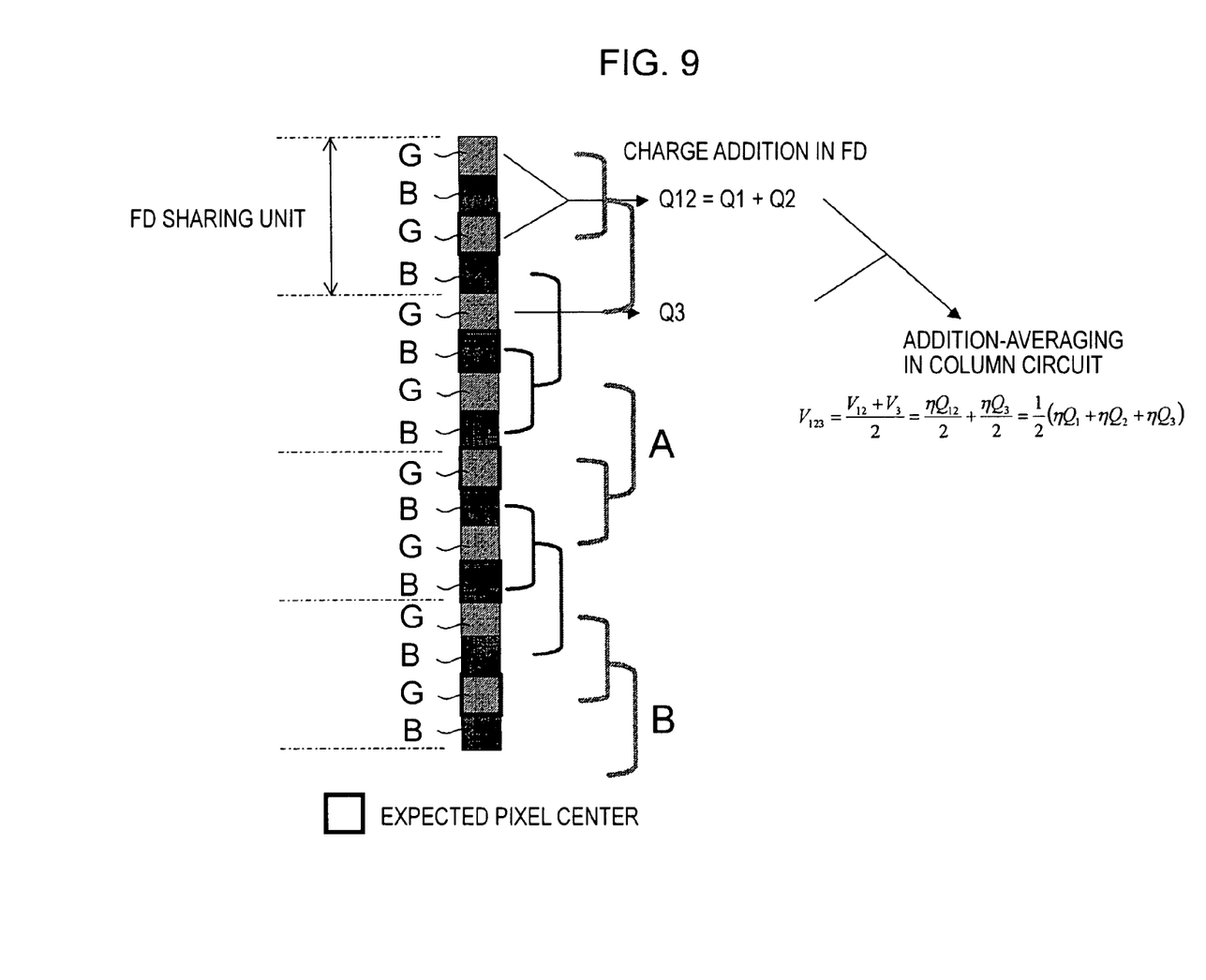
FIG. 9 is a conceptual diagram illustrating the addition operation on 3×3 pixels.

As shown in FIG. 9, in performing an addition operation with respect to 3×3 pixels, an averaging operation may be performed between a signal yielded by a charge-addition operation in a FD portion (charge-added pixel) and a signal from an adjacent pixel (non-added pixel) which has not been added, thereby obtaining an expected signal. It is to be noted, however, this operation results in two types of operational block having different orders of the charge-added pixels and the non-added pixels, as indicated by A and B in FIG. 9. In this case, a suitable driving sequence of a transfer gate may need to be configured using an appropriate driving logic.

Figure 10A:
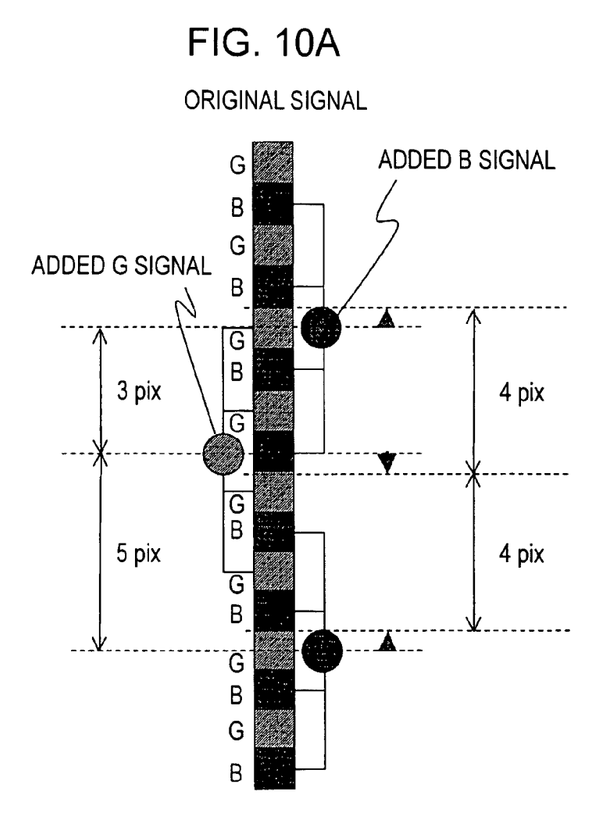
FIG. 10A is a conceptual diagram illustrating the addition operation on 4×4 pixels.
Figure 10B:
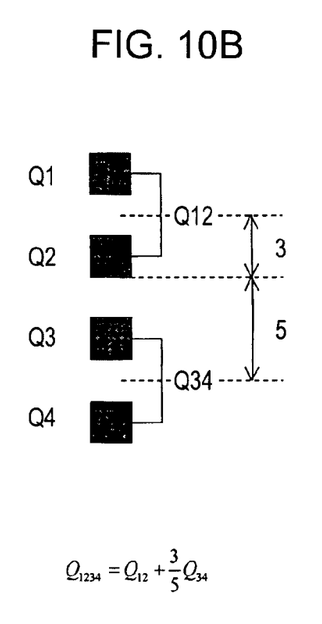
FIG. 10B is a conceptual diagram illustrating the pixel centers of four pixels yielded by simple addition and averaging operations.

An operation for adding signals from 4×4 pixels will now be described with reference to FIGS. 10A and 10B, by way of example. In this case, addition is performed by adding, at a predetermined ratio, the signals which are obtained by the addition operation conducted in FDs. An addition operation on four pixels having an identical color without changing the addition ratio yields the result that, while the center of a virtual pixel G (green), expressed as an added G signal in FIG. 10A, is spaced apart by a distance corresponding to three pixel pitches from the center of the adjacent virtual pixel B (blue), expressed as added B signal, the center of the same virtual pixel G is spaced apart from another adjacent virtual pixel B by a distance corresponding to five pixel pitches, thus developing a distance ratio of 3:5. An addition operation on four pixels of an identical color is performed while taking this ratio into account. More specifically, the addition is performed by setting a ratio of 5:3 between Q12 which is the result of the addition on the charges (Q1, Q2) of two pixels out of the four pixels and Q34 which is the result of the addition on the charges (Q3, Q4) of the other two pixels. As a result of this addition operation performed at the ratio of 5:3, an equal distance or pitch, which amounts to four pixel pitches in this case, can be obtained between the centers of the successive virtual pixels B and G. As for the substantial procedure for the addition operation, one described in the first or second embodiment can be employed.

Thus, according to the embodiments of the present invention, the pitch between each pair of the adjacent apparent pixel centers of the low-resolution output signal can be equalized by the addition-averaging operation performed in the course of readout, thereby enabling high-speed output without changing any color arrangement of the pixel array. In a solid-state imaging device configured to have a charge-to-voltage converter shared among a plurality of pixels, the low-resolution signals can be output without changing the color arrangement, regardless of any difference between the unit of the pixels sharing the converter and the unit of the signals to be added.

Furthermore, according to the present invention, a solid-state imaging device may be a one-chip type solid-state imaging device, or may be a module type solid-state imaging device formed from a plurality of chips. A module type solid-state imaging device includes at least a sensor chip for imaging. The module type solid-state imaging device may further include an optical system.

Figure 11:
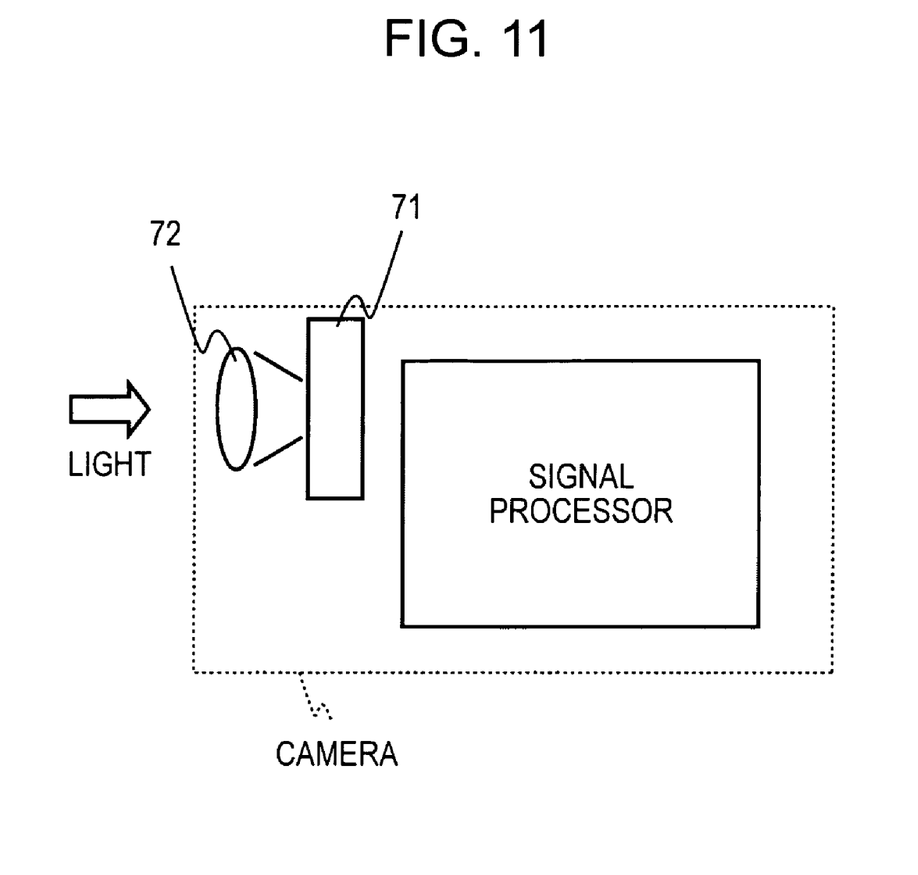
FIG. 11 is a schematic diagram illustrating the camera to which the present invention is applied.

FIG. 11 is a camera to which the present invention may be applied, which includes a imaging portion 71 and an optical system 72. When the present invention is applied to a camera, the pitch between each pair of the adjacent apparent pixel centers of the low-resolution image signal can be equalized by the addition-averaging operation performed in the course of readout, thereby enabling high-speed output without changing any color arrangement of the pixel array. In a camera including a solid-state imaging device configured to have a charge-to-voltage converter shared among a plurality of pixels, the low-resolution signals can be output without changing the color arrangement, regardless of any difference between the unit of the pixels sharing the converter and the unit of the signals to be added.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   an output circuit;
   a pixel array in which a plurality of pixel cells, each of which includes a plurality of photoelectric conversion elements, are arranged;
   a scanning circuit effective to selectively drive the pixel cells;
   a transfer circuit effective to transfer signals from the pixel array to the output circuit; and
   an adder which is electrically coupled between the photoelectric conversion elements and sets a ratio between the signals to be added based on the arrangement of the photoelectric conversion elements
   wherein,
   the adder consists of, a plurality of vertical signal lines connecting each pixel to one of two systems, each system consisting of a first and second capacitor respectively, the first capacitor having a larger capacitance than the second capacitor,
   the ratio being set by the first and second capacitors, wherein, the capacitors are connected through first, second and third switches,
   a pixel signal from an ith row is stored in the first capacitor and a pixel signal of an identical color from a jth row stored in the second capacitor by the switches being in predetermined ON, OFF states,
   the signals are added-averaged row wise accord to the capacitor ratio by turning ON the third switch while the first and second switches are held OFF, and for adding-averaging the pixel data column wise, a signal from an nth column is stored in the first capacitor with a signal from a pixel of an identical color from a jth column stored in the second capacitor by the switches simultaneously being in predetermined ON, OFF states wherein, the signals stored in the first and second capacitor are added-averaged column wise according to the capacitor ratio by turning ON the third switch and holding the first and second switches OFF, and
   the adder adds together signals from non-adjacent pixels, no signal is used twice in consecutive addition operations, and
   the ratio for the addition operation used by the adder is such that the pitches between centers of virtual pixels resulting from the addition operation are equalized.

2. A solid-state imaging device according to claim 1, wherein the ratio for the addition operation used by the adder is determined so that pitches between the centers of virtual pixels obtained as a result of the addition operation are equalized.

3. A solid-state imaging device according to claim 1, wherein the adder is included in a charge-to-voltage converter for converting charges supplied from the photoelectric conversion elements into voltages.

4. A solid-state imaging device according to claim 1, wherein the adder is included in a correlated double sampling circuit for removing a noise component from the signals output from the photoelectric conversion elements.

5. A solid-state imaging device according to claim 1, wherein the adder is included in an analog-to-digital converter circuit for converting the signals output from the photoelectric conversion elements into digital signals.

6. A solid-state imaging device comprising:
   an output circuit;
   a pixel array in which a plurality of pixel cells, each of which includes a plurality of photoelectric conversion elements, are arranged;
   a scanning circuit effective to selectively drive the pixel cells;
   a transfer circuit effective to transfer signal from the pixel array to the output circuit;
   an adder electrically coupled between the photoelectric conversion elements and the transfer circuit and which performs an addition operation on a plurality of signals output from the photoelectric conversion elements of the pixel array in a predetermined combination of the photoelectric conversion elements, while setting the adder sets a ratio between the signals to be added a ratio the ratio determined according to the arrangement of the photoelectric conversion elements; and
   a controller for controlling exposure times on the photoelectric conversion elements using the ratio determined according to the arrangement of the plurality of photoelectric conversion elements when an addition operation is performed on a plurality of signals output from the plurality of photoelectric conversion elements in the pixel array in the predetermined combination,
   wherein,
   the adder consists of, plurality of vertical signal lines connecting each pixel to one of two systems, each system consisting of a first and second capacitor respectively, the first capacitor having a larger capacitance than the second capacitor,
   the ratio being set by the first and second capacitors, wherein, the capacitors are connected through first, second and third switches,
   a pixel signal from an ith row is stored in the first capacitor and a pixel signal of an identical color from a jth row stored in the second capacitor by the switches being in predetermined ON, OFF states,
   the signals are added-averaged row wise according to the capacitor ratio by turning ON the third switch while the first and second switches are held OFF, and for adding-averaging the pixel data column wise, a signal from an nth column is stored in the first capacitor with a signal from a pixel of an identical color from a jth column stored in the second capacitor by the switches simultaneously being in predetermined ON, OFF states wherein, the signals stored in the first and second capacitor are added-averaged column wise according to the capacitor ratio by turning ON the third switch and holding the first and second switches OFF, and the adder adds together signals from non-adjacent pixels, no signal is used twice in consecutive addition operations, and the ratio for the addition operation used by the adder is such that the pitches between centers of virtual pixels resulting from the addition operation are equalized.

7. A solid-state imaging device according to claim 6, wherein the ratio of the exposure times used by the controller is determined so that pitches between the centers of virtual pixels obtained as a result of the addition operation are equalized.

8. A driving method for a solid-state imaging device including a pixel array in which a plurality of pixel cells, each of which includes a plurality of photoelectric conversion elements, are arranged, and an adder for performing an addition operation on a plurality of signals output from the plurality of photoelectric conversion elements in the pixel array in a predetermined combination, the method comprising the steps of:

capturing an image with the pixel array;

causing the adder to perform the addition operation on the plurality of signals using a ratio determined according to the arrangement of the plurality of photoelectric conversion elements; and transferring the added signals to an output circuit, wherein, the adder consists of, a plurality of vertical signal lines connecting each pixel to one of two systems, each system consisting of a first and second capacitor respectively, the first capacitor having a larger capacitance than the second capacitor, the ratio being set by the first and second capacitors, wherein, the capacitors are connected through first, second and third switches, a pixel signal from an ith row is stored in the first capacitor and a pixel signal of an identical color from a jth row stored in the second capacitor by the switches being in predetermined ON, OFF states, the signals are added-averaged row wise according to the capacitor ratio by turn ON the third switch while the first and second switches are held OFF, and for adding-averaging the pixel data column wise, a signal from an nth column is stored in the first capacitor with a signal from a pixel of an identical color from a jth column stored in the second capacitor by the switches simultaneously being in predetermined ON, OFF states wherein, the signals stored in the first and second capacitor are added-averaged column wise according to the capacitor ratio by turning ON the third switch and holding the first and second switches OFF, and the adder adds together signals from non-adjacent pixels, no signal is used twice in consecutive addition operations, and the ratio for the addition operation used by the adder is such that the pitches between centers of virtual pixels resulting from the addition operation are equalized.

9. A driving method according to claim 8, wherein the ratio for the addition operation used by the adder is determined so that pitches between the centers of virtual pixels obtained as a result of the addition operation are equalized.

10. A driving method for a solid-state imaging device including a pixel array in which a plurality of pixel cells, each of which includes a plurality of photoelectric conversion elements, are arranged, and a controller for controlling exposure times on the plurality of photoelectric conversion elements in the pixel array, the method comprising the step of:

capturing an image with the pixel array;

causing the controller to control the exposure times using a ratio determined according to the arrangement of the plurality of photoelectric conversion elements, when an addition operation is performed on a plurality of signals output from the plurality of photoelectric conversion elements in the pixel array in a predetermined combination;

performing the addition operation on a plurality of signals output from the photoelectric conversion elements of the pixel array in the predetermined combination of the photoelectric conversion elements, while setting between the signals to be added a ratio determined according to the arrangement of the photoelectric conversion elements; and transferring the added signals to an output circuit, wherein, the adder consists of, a plurality of vertical signal lines connecting each pixel to one of two systems, each system consisting of a first and second capacitor respectively, the first capacitor having a larger capacitance than the second capacitor, the ratio being set by the first and second capacitors, wherein, the capacitors are connected through first, second and third switches, a pixel signal from an ith row is stored in the first capacitor and a pixel signal of an identical color from a jth row stored in the second capacitor by the switches being in predetermined ON, OFF states, the signals are added-averaged row wise according to the capacitor ratio by turning ON the third switch while the first and second switches are held OFF, and for adding-averaging the pixel data column wise, a signal from an nth column is stored in the first capacitor with a signal from a pixel of an identical color from a jth column stored in the second capacitor by the switches simultaneously being in predetermined ON, OFF states wherein, the signals stored in the first and second capacitor are added-averaged column wise according to the capacitor ratio by turning ON the third switch and holding the first and second switches OFF, and the adder adds together signals from non-adjacent pixels, no signal is used twice in consecutive addition operations, and the ratio for the addition operation used by the adder is such that the pitches between centers of virtual pixels resulting from the addition operation are equalized.

11. A driving method according to claim 10, wherein the ratio of the exposure times used by the control portion is determined so that pitches between the centers of virtual pixels obtained as a result of the addition operation are equalized.

12. A camera comprising:

a storage portion in which an signals representing an image can be stored; and an imaging portion which can generate the signals representing and image from incident light, the imaging portion including (a) an output circuit, (b) a pixel array in which a plurality of pixel cells, each of which includes a plurality of photoelectric conversion elements, are arranged, (c) a scanning circuit effect to selectively drive the pixel cells, (d) a transfer circuit effect to transfer signals from the pixel array to the output circuit; and (e) an adder electrically coupled between the photoelectric conversion elements and the transfer circuit and which performs an addition operation on a plurality of signals output from the photoelectric conversion elements of the pixel array in a predetermined combination of the photoelectric conversion elements, while setting between the signals to be added a ratio determined according to the arrangement of the photoelectric conversion elements, wherein, the adder consists of, a plurality of vertical signal lines connecting each pixel to one of two systems, each system consisting of a first and second capacitor respectively, the first capacitor having a larger capacitance than the second capacitor, the ratio being set by the first and second capacitors, wherein, the capacitors are connected through first, second and third switches, a pixel signal from an ith row is stored in the first capacitor and a pixel signal of an identical color from a jth row stored in the second capacitor by the switches being in predetermined ON, OFF states, the signals are added-averaged row wise according to the capacitor ratio by turning ON the third switch while the first and second switches are held OFF, and for adding-averaging the pixel data column wise, a signal from an nth column is stored in the first capacitor with a signal from a pixel of an identical color from a jth column stored in the second capacitor by the switches simultaneously being in predetermined ON, OFF states wherein, the signals stored in the first and second capacitor are added-averaged column wise according to the capacitor ratio by turning ON the third switch and holding the first and second switches OFF, and the adder adds together signals from non-adjacent pixels, no signal is used twice in consecutive addition operations, and the ratio for the addition operation used by the adder is such that the pitches between centers of virtual pixels resulting from the addition operation are equalized.

\* \* \* \* \*